US 6,408,625 B1

(12) United States Patent
Woon et al.

(10) Patent No.: US 6,408,625 B1
(45) Date of Patent: Jun. 25, 2002

(54) OPERATING TECHNIQUES FOR INTERNAL COMBUSTION ENGINES

(75) Inventors: Peter V. Woon; Axel O. Zur Loye; Larry J. Brackney; Jay F. Leonard; Eric K. Bradley; Terry M. Vandenberghe; Jacqueline M. Yeager; Julie A. Wagner, all of Columbus; Greg A. Moore, Grammer, all of IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/487,526

(22) Filed: Jan. 19, 2000

Related U.S. Application Data
(60) Provisional application No. 60/116,620, filed on Jan. 21, 1999.

(51) Int. Cl.[7] .......................... F02B 33/44; F02N 11/06
(52) U.S. Cl. ........................ 60/608; 60/606; 60/607; 123/559.1; 123/339.18; 123/198 F; 290/40 R; 290/40 B; 290/40 C; 290/52
(58) Field of Search .................... 60/608, 606, 607; 123/559.1, 198 F, 339.18, 527, 299, 406.23; 290/40 B, 40 C, 40 R, 52

(56) References Cited

U.S. PATENT DOCUMENTS

| 2,067,288 A | 1/1937 | Riehm |
| 2,325,032 A | 7/1943 | Bochi |
| 3,618,313 A | 11/1971 | Zehnder |
| 3,941,113 A | 3/1976 | Baguelin |
| 4,191,152 A | 3/1980 | Deutschmann |

(List continued on next page.)

FOREIGN PATENT DOCUMENTS

| DE | 35 39 578 A1 | 8/1985 | |
| DE | 34 21 775 A1 | 12/1985 | |
| DE | 35 39 168 A1 | 7/1986 | |
| DE | 37 14 192 A1 | 11/1988 | |
| EP | 0 134 373 A1 | 7/1983 | |
| JP | 03 145530 A | 6/1991 | .................. 290/52 |
| JP | 05 044519 A | 2/1993 | ........ 123/FOR 101 |
| JP | 05 171965 A | 9/1993 | ............. 123/198 F |

OTHER PUBLICATIONS

JPO & Japio Abstract, *"Diesel Generator for Emergency"*, Hitachi Ltd., Publication No. 63170531, Jul. 14, 1988.

JPO & Japio Abstract, *"Turbo Charger With Rotary Electric Machine"*, Isuzu Motors Ltd., Publication No. 01170721, Jul. 5, 1989.

(List continued on next page.)

*Primary Examiner*—Thomas Denion
*Assistant Examiner*—Thai Ba Trieu
(74) *Attorney, Agent, or Firm*—Woodard, Emhardt, Naughton, Moriarty & McNett

(57) ABSTRACT

An electric power generation system is disclosed, which includes a back-up electric power generator driven by a four-cycle internal combustion engine. The engine includes a plurality of reciprocating cylinders each rotatably coupled to a crankshaft, which drives the electric power generator. The engine also includes a compressor along an intake pathway to deliver pressurized air to the cylinders and a turbine along an exhaust pathway to power the compressor when driven by exhaust discharged from the cylinders. The engine is prepared to accept a generator load by increasing boost pressure provided by the compressor. This increase is accomplished by skip-firing the cylinders in a selected pattern, retarding ignition timing for the cylinders, or a combination of these techniques. A unique skip-fueling control pattern is also disclosed.

46 Claims, 8 Drawing Sheets

U.S. PATENT DOCUMENTS

| | | |
|---|---|---|
| 4,470,390 A | 9/1984 | Omori et al. |
| 4,502,282 A | 3/1985 | Kanesaka |
| 4,572,148 A | 2/1986 | Deutschmann et al. |
| 4,641,613 A | 2/1987 | Delesalle |
| 4,665,704 A | 5/1987 | Hartwig |
| 4,671,226 A | 6/1987 | van Rinsum |
| 4,742,681 A | 5/1988 | Haberkern et al. |
| 4,757,686 A * | 7/1988 | Kawamura et al. ............ 60/608 |
| 4,867,127 A | 9/1989 | Quirchmayr et al. |
| 4,878,347 A * | 11/1989 | Kawamura ..................... 60/608 |
| 4,955,199 A * | 9/1990 | Kawamura ..................... 60/608 |
| 4,958,497 A | 9/1990 | Kawamura |
| 4,961,406 A | 10/1990 | Burandt |
| 5,105,779 A | 4/1992 | Thompson |
| 5,195,485 A | 3/1993 | Jensen et al. |
| 5,218,945 A | 6/1993 | Kapellen et al. |
| 5,271,229 A | 12/1993 | Clarke et al. |
| 5,377,631 A | 1/1995 | Schechter |
| 5,390,491 A | 2/1995 | Suzumura et al. |
| 5,408,974 A | 4/1995 | Lipinski et al. |
| 5,450,828 A | 9/1995 | Sakamoto et al. |
| 5,477,830 A | 12/1995 | Beck et al. |
| 5,479,898 A | 1/1996 | Cullen et al. |
| 5,481,461 A | 1/1996 | Miyamoto et al. |
| 5,492,094 A | 2/1996 | Cullen et al. |
| 5,501,073 A | 3/1996 | Miyashita et al. |
| 5,529,549 A | 6/1996 | Moyer |
| 5,533,492 A | 7/1996 | Willey et al. |
| 5,553,575 A | 9/1996 | Beck et al. |
| 5,568,795 A | 10/1996 | Robichaux et al. |
| 5,572,970 A | 11/1996 | Fukumura |
| 5,575,266 A | 11/1996 | Iida |
| 5,622,053 A * | 4/1997 | Freen ......................... 123/299 |
| 5,694,899 A | 12/1997 | Chvatal et al. |
| 5,738,070 A | 4/1998 | Donaldson et al. |
| 5,904,131 A | 5/1999 | O'Neill et al. |
| 5,949,146 A * | 9/1999 | Vandenberghe ........... 290/40 R |
| 5,996,552 A * | 12/1999 | Iijima et al. ........... 123/339.18 |
| 6,109,025 A * | 8/2000 | Murata et al. ............ 290/40 B |

OTHER PUBLICATIONS

JPO & Japio Abstract, "*Power Generation Increase Device at Idle Time*", Isuzu Motors Ltd., Publication No. 03145530, Jun. 20, 1991.

JPO & Japio Abstract, "*Torque–Down Controller By Means of Compound Device*", Nissan Motor Co. Ltd., Publication No. 05001593, Jan. 8, 1993.

JPO & Japio Abstract, "*Rotational Change Prevention Device of Internal Combustion Engine*", Nippondenso Co. Ltd., Publication No. 05044519, Feb. 23, 1993.

JPO & Japio Abstract, "*Control Method for Variable Cylinder Engine*", Mitsubishi Motors Corp., Publication No. 05171965, Jul. 9, 1993.

JPO & Japio Abstract, "*Fuel Injection Device for Engine Provided with Supercharger, and Control Method Thereof*", Komatsu Ltd., Publication No. 10288057, Oct. 27, 1998.

Yves Baguelin, "*Diesel Piston Engine Providing a Controlled Air Compressor Function*," Mar. 20, 1985. Purported English Translation for European Patent No. EP 0 134 373 A1.

Piech, Ferdinand, "*Operating turbocharged spark ignition motor vehicle engine by programmed omission of ignitions at idling and low load to introduce unbarnt fuel in exhaust lines,*" Derwent Publications LTD, England, 1985. Purported English Abstract for German Patent No. DE 34 21 775 A1.

Giesen, Klaus, "*Driving procedure for turbocharged IC engine controlling response to increased demand by regulator adjusting transient engine condition to increase exhaust gas power,*" Derwent Publications LTD, England, 1985. Purported English Abstract for German Patent No. DE 35 39 168 A1.

Greiner, Max, "*Exhaust turbocharger for vehicle IC engine adjusts ignition timing or opening of engine outlet valves to improve acceleration at high revolutions,*" Derwent Publications LTD, 1988. Purported English Abstract for German Patent No. DE 37 14 192 A1.

Hiroshi Matsuoka, "*Device for Increasing the Electric Power Generation Rate in Idle Mode,*" Japan, Jun. 20, 1991. Purported English Translation for Japanese Patent No. JP 03 145530 A.

Miyamoto Katsuhiko, "*Control Method for Variable Cylinder Engine,*" Japan, Sep. 7, 1993. Purported English Abstract for Japanese Patent No. JP 05 171965 A.

Kazuhiro Nakai, "*Variable Rotation Prevention Device for an Internal Combustion Engine,*" Japan, Feb. 23, 1993. Purported English Translation for Japanese Patent No. JP 05 044519 A.

Ferinand Piech, "*Applied Ignition, Multicylinder Internal--Combustion Engine with Exhaust Gas Turbocharging,*" Germany, Dec. 8, 1994. Purported English Translation for German Patent No. DE 35 39 578 A1.

* cited by examiner

OPERATING TECHNIQUES FOR INTERNAL COMBUSTION ENGINES

CROSS-REFERENCE TO RELATED APPLICATIONS

The present application claims the benefit of U.S. Provisional Application No. 60/116,620, filed Jan. 21, 1999.

BACKGROUND OF THE INVENTION

The present invention relates to internal combustion engines, and more particularly, but not exclusively, is directed to operating techniques for a turbocharged internal combustion engine to better accommodate load changes.

It is generally desirable that internal combustion engines rapidly respond to changing load conditions in as efficient a manner as possible. One application that commonly presents large, sudden load increases is a back-up power generation system having an internal combustion engine as the prime mover. Frequently, these arrangements are used to provide power to vital systems in the event of an unexpected loss of electric power from the usual sources—such as the power company grid. One difficulty with these arrangements is that the transition of the engine from a light stand-by generator load to a full generator load, sometimes called "block loading," causes a significant droop in the electrical output of the generator. This droop may be harmful to systems being provided the electric power.

One attempt to solve this problem has been to increase the size of the engine to handle block loading. However, once the block loading transition has passed, the engine is typically oversized in relation to the steady state loading imposed by the generator. Thus, there is a need for a more efficient technique to accept back-up generator loads without imposing a substantial transition droop penalty. Also, it would be particularly advantageous if this need could be met using an engine capable of operation with a gaseous fuel because of its ready availability in many locations that require a back-up power generation system. Moreover, other internal combustion engine applications would benefit from better techniques to handle load transitions, including, for example, vehicle applications.

The present invention meets these needs and provides other important benefits and advantages.

SUMMARY OF THE INVENTION

One form of the present invention is a unique internal combustion engine system. Additionally or alternatively, another form of the present invention includes a unique technique to handle engine load transitions. These forms may include skip fueling and/or controllably altering engine timing. Also, these forms may find use in a variety of internal combustion engine applications, including electric power generation, and vehicle propulsion systems, to name a few.

A further form of the present invention is a technique for generating electric power. This technique includes starting an internal combustion engine having a number of combustion chambers and a turbocharger. The engine is a primary source of motive power for an electric power generator. The chambers each have a respective fueling period. The engine is prepared to accept a generator load by withholding fuel during a respective fueling period of a portion of the chambers to increase boost pressure provided with the turbocharger.

In another form of the present invention, a technique for generating electric power includes starting an internal combustion engine that has a number of combustion chambers and a turbocharger. The engine is a prime mover for an electric power generator. The engine is prepared to accept a generator load by retarding ignition timing of at least a portion of the chambers to reach a predetermined boost pressure threshold with the turbocharger.

In still another form of the present invention, an engine includes a number of combustion chambers, a compressor along an intake pathway to deliver pressurized air to the chambers, and a turbine along an exhaust pathway to power the compressor. The system also has a means for preparing the engine to accept load transitions by providing a corresponding pressure level with the compressor. An engine crankshaft may be rotatably coupled to an electric power generator to provide an electric power generation system and correspondingly accommodate block loading with this means.

An additional form includes an electric power generation system having an electric power generator, an internal combustion engine, a sensor, and a controller. The engine includes a crankshaft rotatably coupled to the generator and a number of cylinders each having a reciprocating piston rotatably coupled to the crankshaft. The cylinders each correspond to one or more of a number of fuel injectors to be selectively fueled therewith during a respective fueling period. A compressor is provided along an intake pathway to deliver pressurized air to the cylinders and a turbine is provided along an exhaust pathway to power the compressor when driven by exhaust from the cylinders. The sensor provides a sensor signal corresponding to pressure provided by the compressor. The controller is operatively coupled to the injectors to regulate cylinder fueling and is responsive to the sensor signal to prepare the engine for a generator load increase. This preparation includes withholding fuel during a respective fueling period of a subset of the cylinders to increase the pressure provided by the compressor. Alternatively or additionally, such preparation may include retarding ignition in the cylinders. The form of ignition subject to retardation may be of any type, such as spark ignition or compression ignition. The controller generates a readiness signal when the pressure reaches a predetermined threshold. The engine accepts the generator load increase in response to the readiness signal.

Yet another form of the present invention is a system including an internal combustion engine, a sensor, and a controller. The engine includes a number of cylinders each having a reciprocating piston rotatably coupled to a crankshaft. The cylinders each have one or more fuel injectors to selectively provide fuel. The sensor provides a signal corresponding to a performance characteristic of the engine. The controller is responsive to the signal to provide skip-fueling of the engine. A quantity of skipped cylinders for a predetermined number of engine cycles is determined by the controller in accordance with the signal. The controller defines a number of skip-fueling patterns each corresponding to a different value of the quantity. The patterns each designate which of the cylinders are skipped and are each configured to rotate through a common number of configurations relative to a reference cylinder. This common number differs from the number of cylinders by at least one. The controller selects one of the patterns in accordance with the quantity and correspondingly generates one or more fuel injection signals when the engine is being skip-fueled. The injectors respond to such signals to fuel of the patterns.

Accordingly, it is one object of the present invention to provide an improved internal combustion engine.

Another object of the present invention is to improve management of changing engine loads.

It is still another object to prepare an internal combustion engine to accept a load increase presented by an electrical power generator.

Further forms, features, objects, advantages, benefits, and aspects of the present invention shall become apparent from the detailed description and drawings provided herewith.

DETAILED DESCRIPTIONS OF THE PREFERRED EMBODIMENTS

Figure 1:
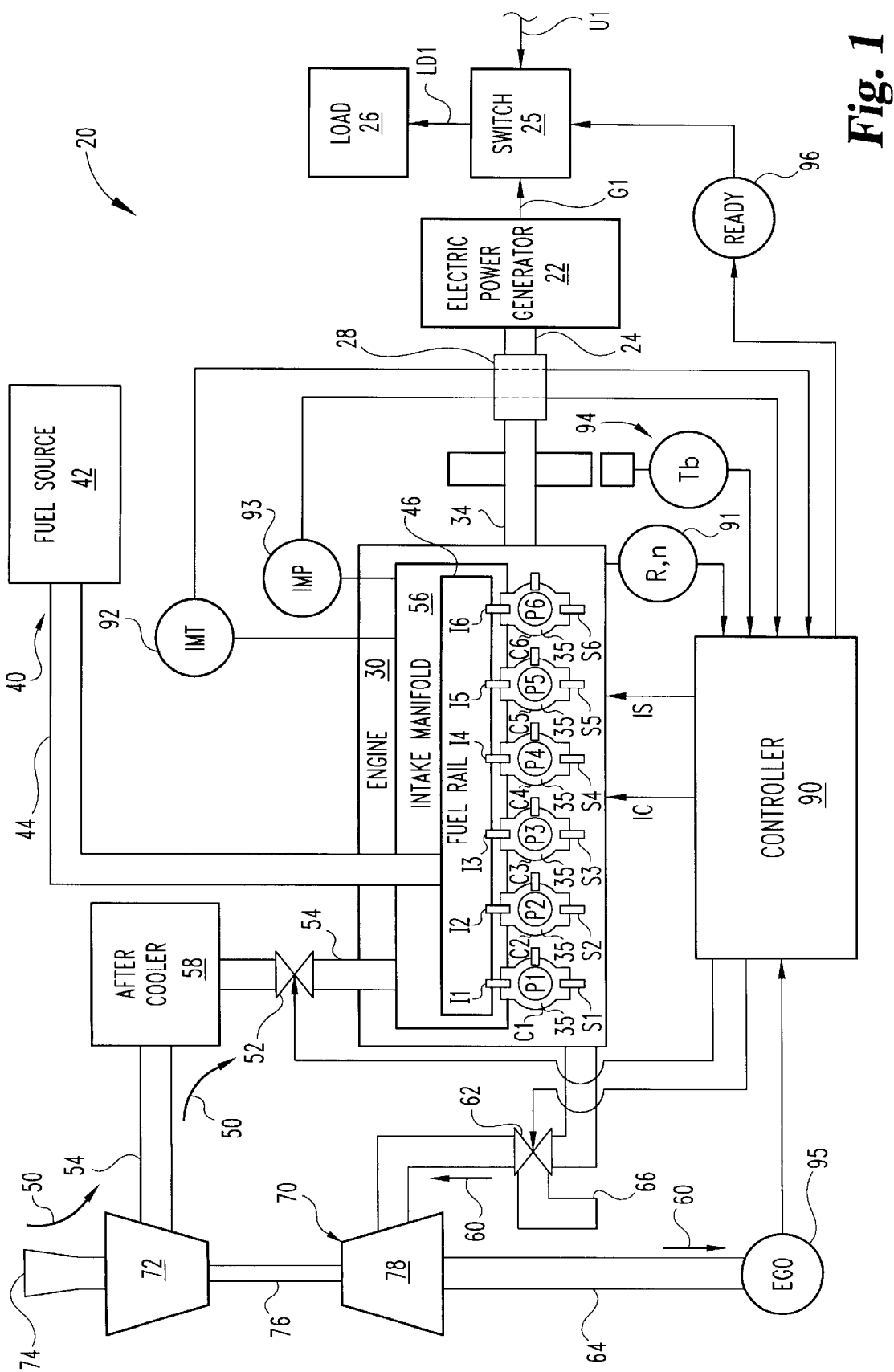
FIG. 1 is a schematic view of a first embodiment of an electric power generation system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 depicts electric power generation system 20 of a first embodiment of the present invention. System 20 includes electric power generator 22. Preferably, generator 22 is of a conventional electromagnetic type which converts the input mechanical energy from rotation of shaft 24 into a generally sinusoidal Alternating Current (A.C.) electric output on generator bus G1. Generator bus G1 is input to power routing switch 25. Similarly, utility power bus U1 is input to switch 25. Switch 25 is configured to select between buses G1 and U1 as a source of power for bus LD1. Bus LD1 is operatively coupled to load 26 to supply electric power thereto. Generator 22 may be configured for single phase or multiphase operation, as appropriate for load 26. Also, an electric power output other than a sinusoidal waveform or A.C. type may be utilized as would occur to those skilled in the art.

System 20 also includes engine 30. Engine 30 is a prime mover for generator 22. Preferably, engine 30 is of a conventional reciprocating piston variety. Shaft 24 of generator is coupled to engine 30 by shaft coupling 28. Shaft coupling 28 may include a gear box, clutch, or other mechanical arrangement to suitably couple crankshaft 34 of engine 30 to shaft 24 of generator 22. In one embodiment, coupling 28 includes a clutch to selectively couple and decouple shafts 24 and 34. Additionally, coupling 28 may include intermeshing gears to change the rotational speed of shaft 24 relative to shaft 34 and may also include a number of selectable gears to change the gear ratio. In still other embodiments, shaft 34 and shaft 24 may be directly coupled to provide a one-to-one turning ratio.

In addition to crankshaft 34, engine 30 includes a number of cylinders C1–C6 each having a corresponding reciprocating piston P1-P6 that is rotatably coupled to crankshaft 34 by a connecting rod in a conventional manner. Each pair of cylinders C1–C6 and pistons P1–P6 in turn corresponds to one of a respective number of combustion chambers 35 of engine 30. Engine 30 also includes fuel injectors 11–16 each shown in fluid communication with one of chambers 35.

System 20 also includes fueling subsystem 40. Subsystem 40 includes fuel source 42 operatively coupled to fueling conduit 44. Fueling conduit 44 is in fluid communication with fuel rail 46. Fuel injectors 11–16 receive fuel from fuel rail 46 to selectively inject fuel into each cylinder C1–C6. Fueling with injectors I1–I6 may be by port injection, direct injection, or using such other injection techniques as would occur to those skilled in the art. Preferably, fuel injectors I1–I6 are of a conventional electromagnetic variety responsive to an input electronic signal IS1–IS6 (collectively designated signals IS). Each cylinder C1–C6 also includes a corresponding combustion igniter S1–S6 of a conventional variety responsive to a respective input electronic signal designated IC1–IC6 (collectively designated signals IC).

Preferably, engine 30 is configured to operate with a gaseous fuel supplied from fuel source 42 that is port-injected with injectors I1–I6. As used herein, a "gaseous fuel" refers to a fuel which is in the gaseous state when contained at standard temperature and pressure. In one preferred embodiment, fuel source 42 includes a natural gas pipeline coupled by appropriate pressure regulation and valve devices to conduit 44. This arrangement is particularly suited to a back-up power generation application where a natural gas pipeline is available to supply fuel in lieu of a fuel source exclusively dedicated to system 20. In other embodiments utilizing a gaseous fuel, fuel source 42 may contain liquid natural gas or a liquid petroleum gas with appropriate apparatus to supply the fuel in its gaseous form through conduit 44 to fuel rail 46. Alternatively, engine 30 is configured to operate with a different type of fuel, such as a liquid fuel like gasoline or diesel fuel, or with a hybrid combination of fuel types.

Engine 30 is of the multicycle type with combustion in each cylinder C1–C6 intermittently contributing power in accordance with a timed sequence of fueling and ignition operations. Preferably, engine 30 is of a conventional four-stroke, reciprocating piston variety. However, in lieu of a reciprocating piston-based engine, a rotor-based engine may be utilized in an alternative embodiment of the present invention. Also, in other embodiments, an engine with a different number of operating cycles, such as a two-cycle sequence, may be utilized.

Air is supplied to cylinders C1–C6 via air intake path 50. Air intake path 50 includes throttle valve 52 positioned therealong to control air flow through conduit 54 to intake manifold 56. Air from intake manifold 56 is mixed with fuel from injectors I1–I6 to selectively provide a combustible charge in each of cylinders C1–C6. Engine 30 also includes exhaust pathway 60. Exhaust from engine 30 exits along pathway 60 through conduit 64. A controllable wastegate valve 62 is included to selectively vent exhaust gases through wastegate outlet 66.

The intake air pathway 50 and exhaust pathway 60 include components of turbocharger 70. Turbocharger 70 includes compressor 72 which draws air through inlet 74 into conduit 54 of pathway 50. The intake air pressurized by compressor 72 is cooled by aftercooler 58 before passing through throttle valve 52. Throttle valve 52 and aftercooler 58 may be of conventional variety commonly used in internal combustion engines. Compressor 72 is driven by turbine 78 via coupling 76. Coupling 76 may include a rotatable shaft, pulley and belt arrangement, intermeshing gears, or such other arrangement to drive compressor 72 with turbine 78 as would occur to those skilled in the art. In still other embodiments, multistage compressors, multistage turbines, variable geometry turbines and/or compressors, or a combination of these are envisioned.

Turbine 78 is driven by exhaust gasses passing through conduit 64 along exhaust pathway 60. To control the pressure and flow rate through pathways 60 and 50, wastegate valve 62 may be selectively opened in response to a control signal WG. By reducing the flow of exhaust gasses to turbine 78, the rotation of both compressor 72 and turbine 78 typically decreases. As a result, the pressure of air supplied along pathway 50 also decreases. Also, the rotation of turbine 78 varies with temperature of the exhaust gases driving it.

System 20 further includes controller 90. Preferably, controller 90 is of a programmable microprocessor variety known to those skilled in the art. Controller 90 is operatively coupled to throttle valve 52 and wastegate 62 supplying corresponding adjustment signals TLT, WG; respectively, as required. Controller 90 is also coupled to rotation sensor 91 which is configured to supply signal R indicative of rotation of shaft 34. Preferably, signal R provides conventional crank angle information about engine 30 which may be utilized for timing operation of engine 30. Rotational engine speed, designated as signal n, is determined from signal R in a conventional manner. In one embodiment, signal R corresponds to a pulse train, the frequency of which is directly proportional to the rotational speed of engine 30. Signal n may then be provided by monitoring the pulse train frequency. U.S. Pat. Nos. 5,165,271 to Stepper et al.; 5,460,134 to Ott et al.; and 5,469,823 to Ott et al. are representative of an arrangement suitable for providing signals R and n.

Controller 90 is also coupled to temperature sensor 92 to provide intake manifold temperature as signal IMT. Controller 90 is operatively coupled to pressure sensor 93 to provide intake manifold pressure signal IMP. Controller 90 is also operatively coupled to torque sensor 94. Sensor 94 is associated with a flywheel along shaft 34 to determine brake torque or "shaft torque" of engine 30 which is designated as signal Tb. Controller 90 is operatively coupled to an exhaust gas oxygen sensor 95 to monitor oxygen content of the exhaust stream exiting conduit 84. Signal EGO corresponds to the detected oxygen level in the exhaust stream.

Controller 90 is also configured to generate a signal READY which is provided to an indicator 96 to indicate that engine 30 is ready to accept block loading from generator 22. Signal READY is sent to switch 25 to control operation thereof.

Figure 2:
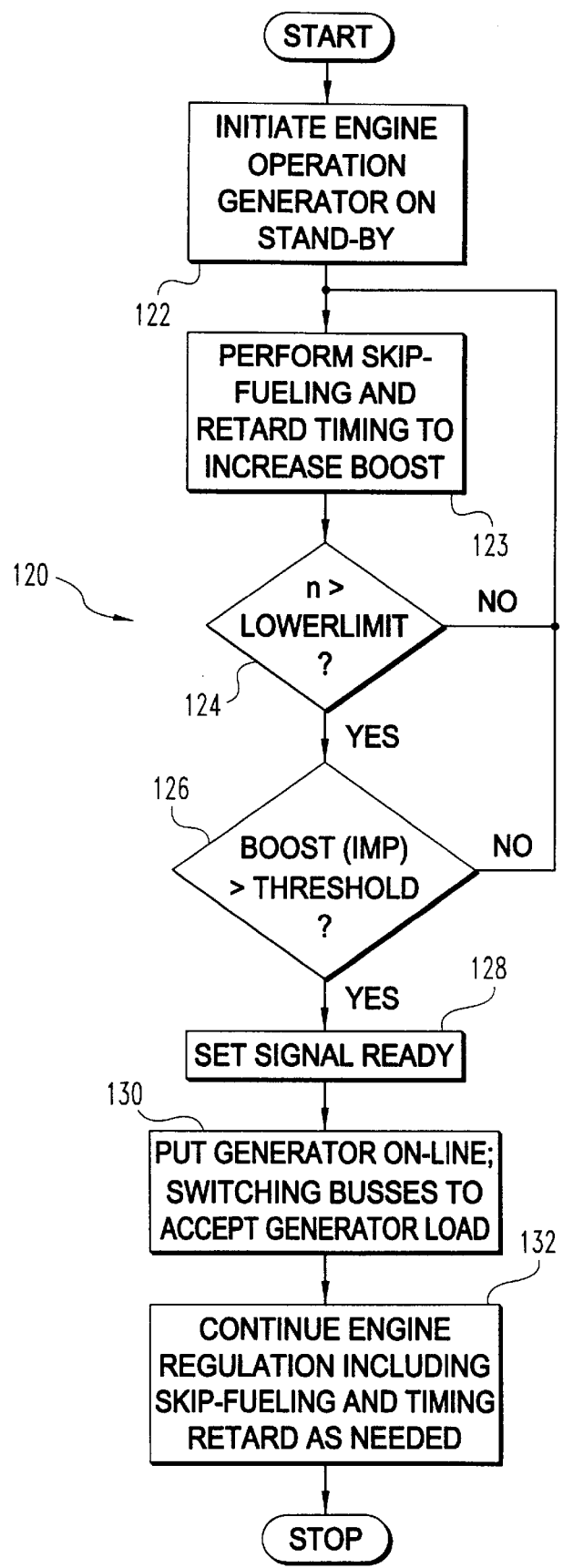
FIG. 2 is flow chart illustrating a start-up routine for the system of FIG. 1.

FIG. 2 is a flow chart of a start-up routine 120 for system 20. Preferably, routine 120 is embodied in hardware and/or programming of controller 90. In routine 120, engine operation is initiated in stage 122. At the same time, generator 22 is in a stand-by mode presenting only a minimal, light load to engine 30. For this stand-by mode, switch 25 is oriented so that busses G1 and LD1 are not connected. Instead, bus LD1 may be operatively coupled to bus U1 while generator 22 is in stand-by mode.

It has been found that a wide open throttle condition with a relatively high intake 15 manifold pressure (corresponding to signal IMP), sometimes called "boost" or "boost pressure," provides a more desirable transition of engine 30 from a no-load or light load condition to a heavy load condition. This high boost pressure better prepares engine 30 to accept the heavy load of generator 22 presented when changing from the stand-by mode to an on-line mode. However, a wide-open throttle condition and high boost pressure are typical of a heavily loaded engine, not a lightly loaded engine. Accordingly, techniques to increase boost pressure of a turbocharged engine under a no-load or light load condition would be desirable to prepare for block loading by a generator or other significant loading event.

In stage 123, the boost pressure is increased in part by withholding fuel from one or more chambers 35 during a respective fueling period associated therewith. This fueling period corresponds to the intake of a combustible charge into the corresponding chamber 35, as is common in the timed operational sequence of a multicycle engine. For the one or more chambers 35 from which fuel is withheld, only air is drawn into the corresponding one or more cylinders C1–C6, resulting in such cylinders being "skipped" during the intake stage. Combustion does not take place in the chamber 35 of any skipped cylinders, increasing the load on the pistons P1–P6 in cylinders C1–C6 that are not skipped. Also, the skipped cylinders operate to pump air through the corresponding combustion chambers 35, which contributes to the air pressure supplied to turbine 78, along with exhaust gases from the "fueled" chambers 35.

In conjunction with the "skip-fueling" process, the boost pressure may be increased by raising the temperature of exhaust gases causing turbine 78 to turn. This temperature increase may be accomplished by retarding combustion of the fuel charge in chambers 35 which have not been skipped (the fueled cylinders). For this embodiment, combustion is retarded by retarding fuel charge ignition timing. Typically, the retarded ignition timing is relative to Top Dead Center (TDC) expressed as a crank angle in degrees After TDC (ATDC). In one preferred embodiment, ignition occurs at least 10 degrees ATDC. In a more preferred embodiment, ignition occurs in a range of about 10 to 20 degrees ATDC.

Generally, the extent retarded ignition timing may be utilized is limited by the maximum tolerable turbine inlet temperature for turbine 78. By changing the chambers 35 which are fueled and subsequently fired from time to time, it has been found that the temperature of any one cylinder may be reduced relative to exclusively firing in the same subset of cylinders all the time during skip-fueling. Moreover, by pumping air through the skipped chambers and cylinders, cooling is facilitated. Thus, by controlling which members of cylinders C1–C6 and corresponding chambers 35 are skipped in a predetermined manner, heat removal may be optimized as part of the skip-fueling process. It is preferred that the number of fueled chambers 35 versus the number of skipped chambers 35 be variable during skip-fueling to provide greater flexibility in achieving a desired profile of boost pressure with respect to time. Furthermore, when the engine is operating at a light load without the need to prepare for a large load increase, this variability may be used to improve engine efficiency by fueling only the number of chambers 35 needed to satisfy the power requirements for the load, with or without retarded ignition timing.

In response to the operations in stage 123, IMP increases. As IMP increases, a wide-open setting of throttle value 52 may be attained even while engine 30 remains lightly loaded. After stage 123, conditional 124 is encountered to determine if rotational speed of engine 30, as indicated by signal n, has exceeded a lower threshold designated LOWERLIMIT. This engine speed threshold test assures engine 30 is operating in a predetermined steady state range. If not, control loops back to stage 123 until the desired rotational speed of engine 30 is achieved. Once the minimum rotational speed is achieved (>LOWERLIMIT), then control flows to conditional 126. In conditional 126, boost pressure, as indicated by signal IMP, is tested to determine whether it exceeds a predetermined threshold, designated THRESHOLD, which is indicative of readiness to accept a block load from generator 22. If boost does not exceed this threshold, then control loops back to stage 123 to continue testing of conditionals 124 and 126 until boost exceeds the threshold.

Once boost exceeds the threshold (IMP>THRESHOLD), controller 90 sets the signal "READY" in stage 128. In stage 130, switch 25 responds to signal READY to reroute the 20 power bus for load 26 from utility power bus U1 to generator bus G1. As a result, a rapid, electrical loading of generator 22 is experienced in correspondence with the power requirements of load 26. The instantaneous load may be particularly large in instances where a number of electric motors and other electromechanical devices are included in load 26 and have reached a stationary state after an unexpected power loss. Because boost pressure has been increased in anticipation of accepting the generator load 26, undesirable characteristics of block loading may be substantially reduced during this transition.

Once the block loading by generator 22 has taken place, control flows to stage 132. Typically, after block load acceptance, the power required to handle the load increase will require fueling of all available cylinders in accordance with the usual timing sequence of engine 30 during stage 132. However, as reflected in FIG. 2, stage 132 may include skip-fueling and timing retardation as required by the associated control system for a particular load or load change to meet desired operational goals. For example, skip-fueling may be desirable to provide for more efficient operation if the generator load drops below a predetermined level.

Figure 3:
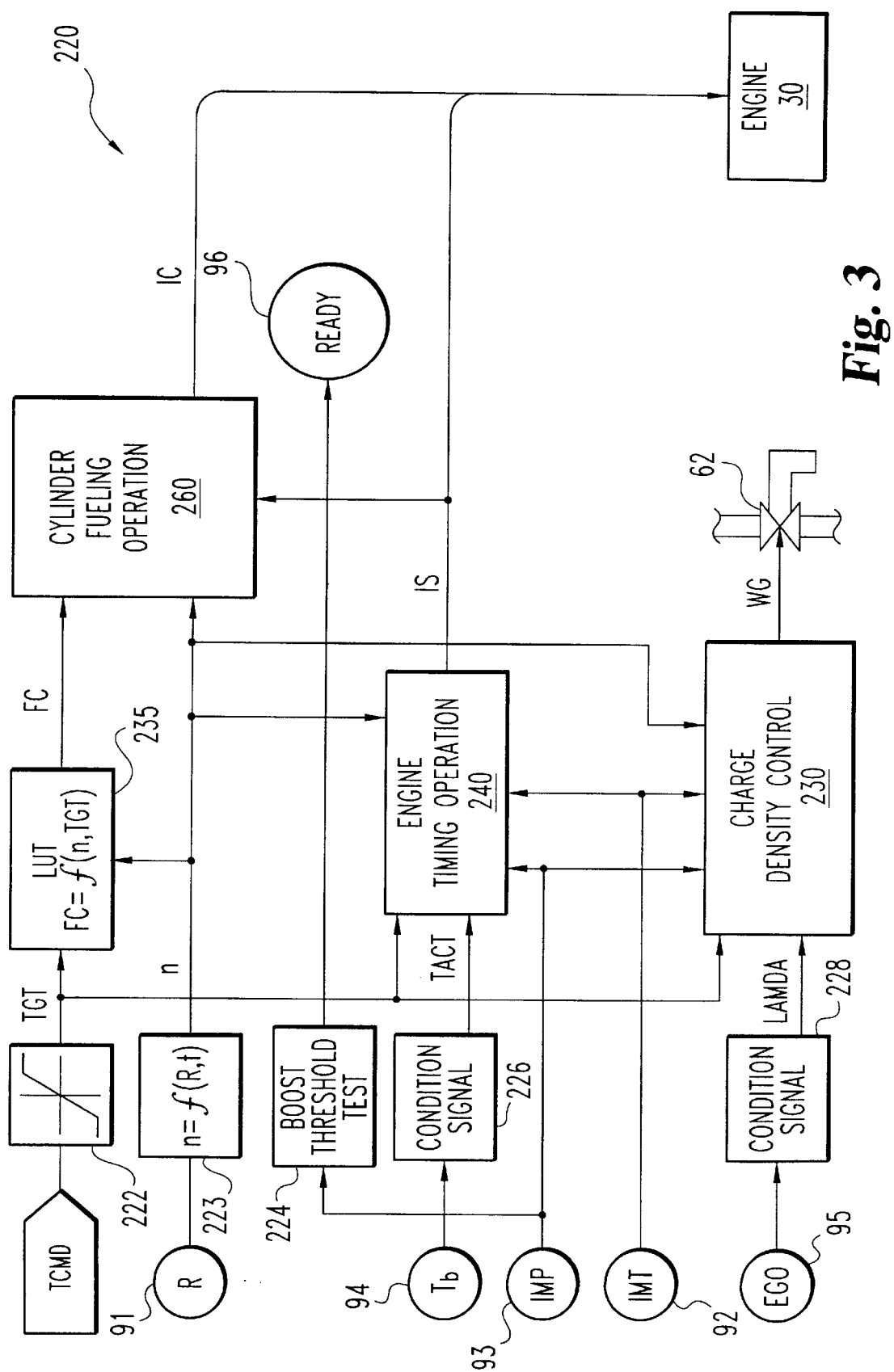
FIG. 3 is a partial control flow diagram of a control system.

FIG. 3 depicts control system 220. Preferably, system 20 includes control system 220 embodied in appropriate hardware and/or software elements of controller 90. For this embodiment, control system 220 preferably provides skip-fueling and retarded ignition timing in accordance with routine 120, and regulates steady-state operation of system 20. However, control system 220 may also be implemented in other internal combustion systems as would occur to those skilled in the art. A primary control input to control system 220 is torque command, TCMD, which is generated by the particular loading requirements of engine 30. Torque command TCMD is limited to a range bounded by upper and lower extremes by limiter 222 to provide an output signal of the torque target TGT. Signal TGT is used in several other operations of system 220. Signal R, provided by sensor 91, is input into operation 223 to provide signal n indicative of engine rotational speed. Like the torque target TGT, signal n is utilized in several operations of system 220. The boost pressure signal IMP, as measured by sensor 93, is also input into several operations.

Operation 224 of control system 220 compares the boost pressure corresponding to signal IMP to a threshold level (THRESHOLD) to determine whether the boost meets or exceeds requirements for block loading by generator 22. Thus operation 224 may correspond to the comparison of conditional 126 previously described for routine 120. If the test is satisfied in operation 224, signal READY is generated and provided to indicator 96.

The brake torque signal Tb provided from sensor 94 is supplied to operation 226 for conditioning. Typically, this conditioning would include compensation to remove noise and smooth the output of measured torque provided as signal TACT. The oxygen level measured in the exhaust gas stream, as represented by signal EGO from sensor 95, is input into a signal conditioning operator 228 to provide an output signal LAMBDA. In an alternative embodiment, a different type of sensor is used in place of sensor 94 that provides an output corresponding to Brake Mean Effective Pressure (BMEP). In turn, Tb may be determined from BMEP using a well-known relationship. Still, in other embodiments, a different feedback parameter may be utilized in place of torque or system 220 may be adapted for "open loop" operation without such a parameter.

For the depicted embodiment, a target torque signal TGT is supplied to a look-up table 235 to determine a fueling command as a function of TGT and n. The fueling command is output as signal FC. The signal TGT is also input to a charge density control operation 230 along with LAMBDA. Charge density control operation 230 generates the wastegate control signal WG to control operation of wastegate 62, and includes the determination of air density from measured parameters as well as air mass flow rate. From the air density and flow rate calculations, an actual air density in intake manifold 56 is estimated. Operation 230 further determines a desired flow density in manifold 56 as a function of TGT, n, and LAMBDA. The actual flow density is compared to the desired flow density to generate a flow rate error. The flow rate error is input into a compensator tuned to provide signal WG. Signal WG correspondingly adjusts air flow to reduce this error.

Signals TGT, TACT, n, IMP, IMT are provided to engine timing operation 240. Operation 240 outputs the engine ignition timing signals IS to corresponding igniters S1–S6 of engine 30. Signals FC, n, IMP, IMT, and IS are input to cylinder fueling operation 260. Operation 260 includes one implementation of the skip-fueling procedure described in connection with FIG. 2. Operation 260 outputs signals IC to control injectors I1–I6 of engine 30.

Figure 4:
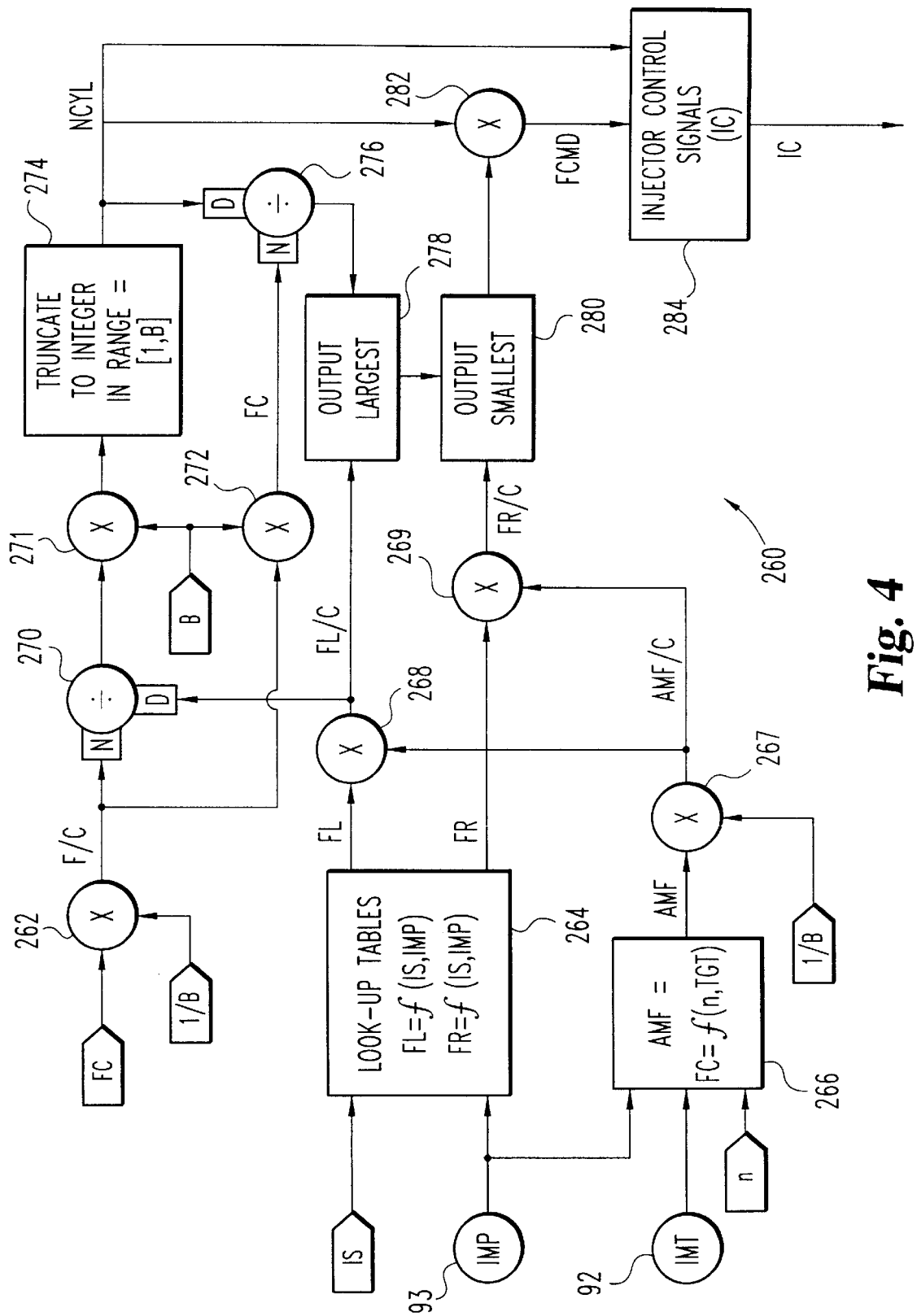
FIG. 4 is a control flow diagram depicting additional aspects of the skip-fueling operation shown in FIG. 3.

Referring additionally to FIG. 4, additional aspects of operation 260 are disclosed beginning with fueling command FC. The fueling command signal FC is multiplied by the inverse of a basis integer B by multiplier 262. The output of multiplier 262 is signal F/C. Signal F/C corresponds to the amount of fuel flow per cylinder desired as a result of the input torque command TCMD. The basis integer B is an integer constant related to the number of cylinders provided by engine 30, and is preferably one more than the number of cylinders C1–C6. In other words, for the six cylinder embodiment of engine 30 presented in FIG. 1, the value of B is preferably seven (B=7). For embodiments having fewer or more cylinders, it is preferred basis integer B be adjusted to be one greater than the cylinder count. Basis integer B is used in implementing the skip-fueling procedure as more filly described hereinafter.

Operation 260 includes look-up tables 264 to determine lean and rich fuel/air ratio limits for engine 30. Tables 264 are three dimensional with independent variables corresponding to the ignition timing provided by signals IS and the boost pressure IMP. The dependent outputs of tables 264, the lean and rich fueling ratios, are converted to fuel amount limits FL and FR, respectively, (not shown). The lean fuel limit FL and the rich fuel limit FR are correspondingly both determined as a function of IS and IMP, and may be expressed in units of gas mass flow for a gaseous-fueled system. Function 266 determines air mass flow AMF by applying the speed density equation. This same calculation may be employed by the charge density control operation 230 to determine the measured air mass flow therein. Specifically, the speed density equation provides AMF for a four cycle engine as follows:

$$AMF=((VE*VDn*IMP)/(2*Ri*IMT));$$

where VE is the volumetric efficiency of the given engine, VD is the volumetric displacement of the given engine, n=rotational engine speed, IMP is the intake manifold pressure, Ri is a ideal gas constant, and IMT is the intake manifold temperature. The speed density equation may be readily adjusted to correspond to other engine cycles, such as a two cycle engine, using techniques known to those skilled in the art. The inverse of the basis value B and AMF are input multiplicands provided to multiplier 267. The product output by multiplier 267 is the ratio of air mass flow to integer B that is designated as signal AMF/C. Signal AMF/C is input to multipliers 268 and 269 to correspondingly generate the lean fueling limit signal FL/C and the rich fueling limit signal FR/C.

Signal FL/C is input as the denominator to divider 270 with signal F/C input as the numerator. The output of divider 270 is (F/C)/(FL/C) F/FL; where F/FL is the ratio of the desired fuel to the lean fuel limit. This ratio is then multiplied by the basis integer B with multiplier 271 to provide a number corresponding to a minimum number of fueled cylinders needed to meet the desired torque command TGT, while staying above the lean fuel limit. In operation 274, the output of multiplier 271 is truncated to the nearest integer in the range of 1 to B, which is then output as signal NCYL. NCYL is input as a denominator to the divider 276 and command FC is input to the numerator after being reconstituted by multiplier 272 as the product of B and F/C.

Divider 276 outputs FC/NCYL to comparator 278. Comparator 278 compares FC/NCYL to FL/C and returns the larger of the two values. Comparator 278 assures that the truncation process of operation 274 does not result in circumventing the lean fuel limit corresponding to signal FL/C. The output from comparator 278 is provided to comparator 280. Comparator 280 returns the smallest of the rich fueling limit represented by signal FR/C and the output of comparator 278. Comparator 280 provides the smallest of the two values to multiplier 282. Comparator 280 assures that fueling does not exceed the rich fueling limit.

Multiplier 282 multiplies the integer value of signal NCYL with the output of operator 280 to provide the total fueling command FCMD. The signals NCYL and FCMD are input into operator 284 to determine one or more corresponding injector control signals IC which are sent to corresponding injectors I1–I6 of engine 30. Operator 284 includes the determination of the duration and timing of injector control signals as well which cylinders C1–C6 to fuel or skip.

In one example of operation 260, let F/C=60 pounds/hour (lb/hr), FL/C=100 lb/hr, FR/C=150 lb/hr, and B=7. For these values, multiplier 270 outputs 60/100=0.6 to multiplier 271. Consequently, multiplier 271 provides the product 7*0.6= 4.2 to operator 274. Operator 274 truncates this input to 4 (NCYL=4). Divider 276 correspondingly outputs: (F/C*B)/ (NCYL) (60*7)/4=420/4=105 lb/hr. Comparator 278 compares 105 lb/hr to FC/C=100 lb/hr, and correspondingly passes 105 lb/hr to comparator 280.

Comparator 280 outputs 105 lb/hr because it is less than FR/C. In response, multiplier 282 provides FCMD=105 lb/hr*4=420 lb/h to operator 284. Operator 284 also receives NCYL=4.

In another example encountering the lean limit, let F/C= 10 lb/hr, with FL/C=100 lb/hr, FR/C=150 lb/hr and B=7. For this example, multiplier 270 outputs 10/100=0.1 to multiplier 271. In turn, multiplier 71 outputs 0.7 to operator 274. Operator 274 outputs the lowest value in the range (NCYL= 1). Correspondingly, divider 276 outputs: (F/C*B)/ (NCYL)=(10*7)/1=70 lb/hr. Because 70 lb/hr is less than FL/C=100 lb/hr, comparator 278 outputs 100 lb/hr. Comparator 280 correspondingly outputs 100 lb/hr to be multiplied with NCYL'1 by multiplier 282. Multiplier 282 outputs FCMD=NCYL*100=1*100=100 lb/hr to operator 284. Operator 284 also receives NCYL=1.

In an example where the rich fueling limit is encountered, let F/C=500 lb/hr, FL/C=100 lb/hr, FR/C=150 lb/hr, and B=7. Correspondingly, multipliers 270, 271 provide: 500/ 100*7=35 to operator 274. Operator 274 outputs the upper end of the Range, NCYL=B=7. In response, divider 276, outputs (500*7)/NCYL=(500*7)/7=500 lb/hr to comparator 278. Comparator 278 outputs FR/C=150 lb/hr because it is less than 500 lb/hr. In response, multiplier 282 outputs FCMD=150*NCYL=150*7=1050 lb/hr to operator 284. Operator 284 also receives NCYL=7.

The rich and lean fueling tables 264 have been adjusted to account for the fact that engine 30 has only 6 actual cylinders C1–C6 that may be fueled at one time. Consequently, the 1050 lb/hr fueling rate from the last example is effectively distributed over the 6 available cylinders. Nonetheless, the input data FCMD 1050 lb/hr and NCYL 7 values are utilized within operator 284 in developing an alternating pattern of cylinders to fuel engine 30 as more fully described hereinafter. Furthermore, it should be understood that output from sensor 95 (signal EGO) is preferably ignored during any skip-fueling mode of operating engine 30.

Figure 5:
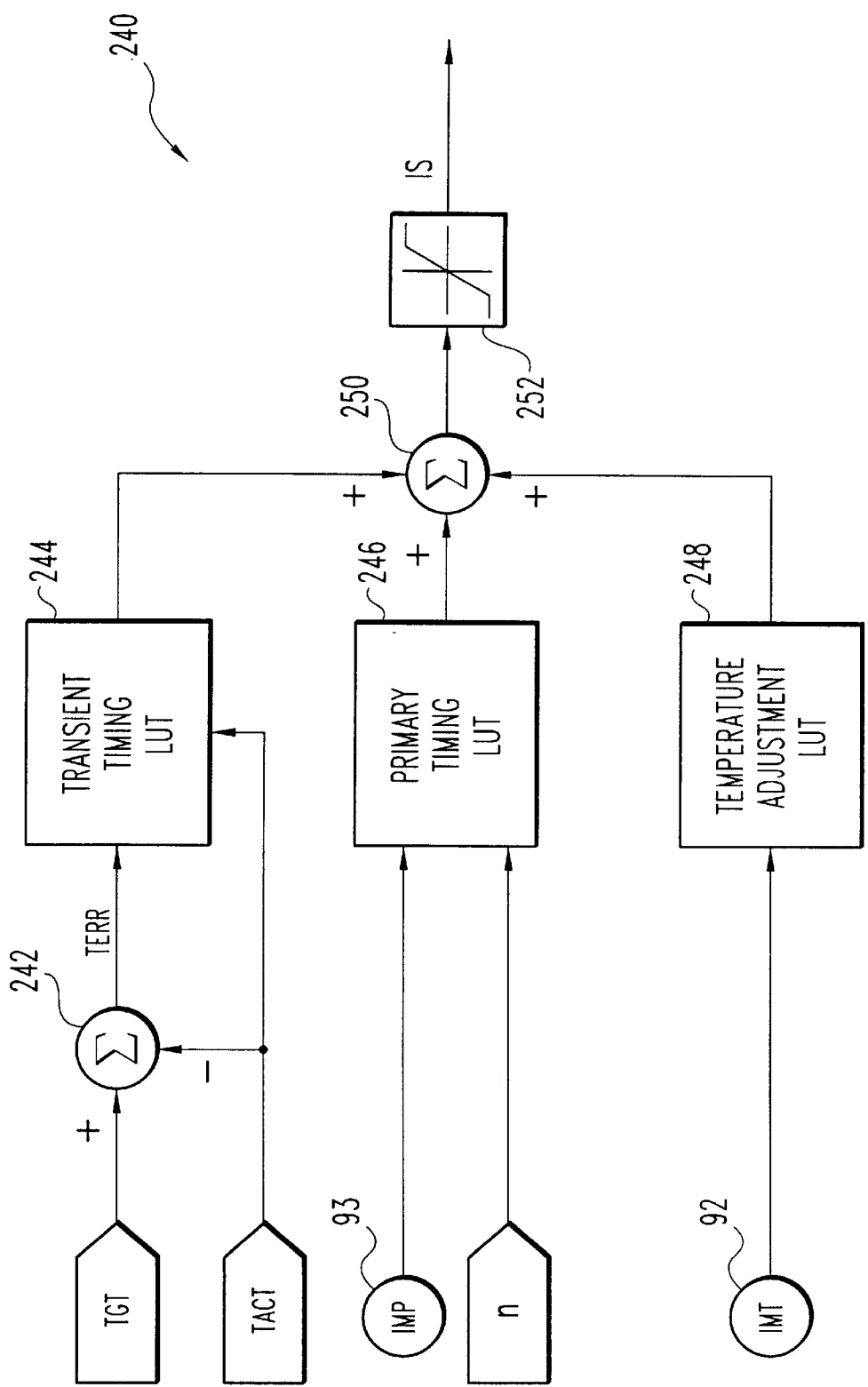
FIG. 5 is a control flow diagram depicting additional aspects of the engine timing operation shown in FIG. 3.

FIG. 5 depicts selected aspects of engine timing operation 240 in greater detail. Adder 242 has the target torque TGT as a positive input and the measured torque, represented by signal TACT, as a negative input to provide negative feedback control. The output of adder 242 is the difference between TGT and TACT represented as error signal TERR (TERR=TGT−TACT). Signals TERR and TACT are input to transient timing look-up table (LUT) 244 to provide a transient timing component for engine operation.

Primary timing look-up table (LUT) 246 receives the intake manifold pressure signal IMP from sensor 93 and the rotational engine speed n as inputs to provide a nominal timing component. Notably, the input of IMP via sensor 93 at this stage indicates whether retarded timing is to be employed. Specifically, if IMP 93 is below the predetermined boost threshold as indicated in condition 126 to FIG. 2, then the primary timing LUT 246 may adjust to a more conventional ignition timing sequence, as required.

Temperature adjustment look-up table (LUT) 248 provides a temperature-based timing component which accounts for changes in intake manifold temperature represented by signal IMT and measured with sensor 92. Summation junction 250 accumulates the timing contributions from transient timing LUT 244, primary timing LUT 246, and temperature adjustment LUT 248 to output a cumulative timing signal. The output of summation operator 250 is limited by limiter 252 and then supplied as Ignition Signals IS1–IS6 to combustion igniters S1–S6. Theses signals are also input to tables 264 shown in FIG. 4 for determining rich and lean fueling limits.

Preferably engine 30 is of the Spark Ignition (SI) type and igniters S1–S6 are a known type of spark-plug. For this arrangement, retarded ignition may be implemented by retarding the spark plug firing by some amount ATDC. However, in another embodiment, engine 30 may be of a Compression Ignition (CI) type. Such CI types can include direct fuel injection or premixed fuel charge varieties. For this alternative, retarded ignition timing to increase boost may be implemented by adjusting fuel injection timing in a known manner. In still other embodiments, different retarded ignition timing techniques may be utilized as would occur to those skilled in the art.

Collectively, the retarded timing procedure of engine timing operation 240 and the skip-fueling procedure of operation 260 provide a means to increase boost pressure to improve the acceptance of a block load presented by electric power generator 22. In other embodiments, different control techniques may be employed which may include only skip-fueling, only timing retardation, or a different arrangement of these procedures as would occur to those skilled in the art.

One preferred technique for alternating which cylinders C1–C6 are fueled during skip-fueling is scheduled by programming of controller 90 as a function of the basis integer B. This technique is preferably incorporated into the skip fueling procedure of control system 220 through, for example, signals IC, IS and NCYL. For this embodiment, it is also preferred that basis integer B be one more than the total number of cylinders, although different integers may be used as would occur to those skilled in the art. Table I depicts seven columns each representing a different skip-fueling pattern in correspondence with a different value of NCYL as follows:

column=NCYL=2; cylinder C2 is skipped, and for row-C3, column=NCYL=2; cylinder C3 is fueled.

To evenly distribute which cylinders are skipped for a given value of NCYL, each pattern is rotated through seven different orientations relative to cylinders C1–C6 and VC. These different orientations are accomplished by shifting each row of table I downward on a periodic basis and wrapping the contents of the last row, VC into the first row, C1. In other words, the first row becomes the 2d row, the 2d row becomes the 3 d row, and so on, with the $7^{th}$ row of Table I replacing the $1^{st}$ row. An example of a one row shift may be observed by comparing Table I to Table II as follows:

TABLE II

|  | NCYL = 1 | NCYL = 2 | NCYL = 3 | NCYL = 4 | NCYL = 5 | NCYL = 6 | NCYL = 7 |
|---|---|---|---|---|---|---|---|
| C1 | 0 | 0 | 0 | 0 | 1 | 1 | 1 |
| C2 | 0 | 0 | 0 | 0 | 0 | 0 | 1 |
| C3 | 0 | 0 | 1 | 1 | 1 | 0 | 1 |
| C4 | 1 | 1 | 1 | 1 | 1 | 1 | 1 |
| C5 | 0 | 0 | 0 | 0 | 0 | 1 | 1 |
| C6 | 0 | 0 | 0 | 1 | 1 | 1 | 1 |
| VC | 0 | 1 | 1 | 1 | 1 | 1 | 1 |

The shifting frequency corresponds to a number of operating cycles of engine 30. For example, for a four-stroke type of engine, it is preferred that the pattern be shifted every four strokes. Moreover, it should be understood that as NCYL changes during the operation of engine 30, the applicable skip-fueling pattern shifts to the column corresponding to the current NCYL value.

Because there is no actual cylinder corresponding to the seventh row, this virtual cylinder (VC) row acts as a placeholder for the corresponding ones and zeros until the next row shift. It has been found that the rotation of the skip-fueling patterns in this manner provides an effective technique to alternate which cylinders are skipped and to smoothly transition from one value of NCYL to the next. In addition, the application of a basis integer B other than the number of actual cylinders provides more even heat distri-

TABLE I

|  | NCYL = 1 | NCYL = 2 | NCYL = 3 | NCYL = 4 | NCYL = 5 | NCYL = 6 | NCYL = 7 |
|---|---|---|---|---|---|---|---|
| C1 | 0 | 0 | 0 | 0 | 0 | 0 | 1 |
| C2 | 0 | 0 | 1 | 1 | 1 | 1 | 1 |
| C3 | 1 | 1 | 1 | 1 | 1 | 1 | 1 |
| C4 | 0 | 0 | 0 | 0 | 0 | 1 | 1 |
| C5 | 0 | 0 | 0 | 1 | 1 | 1 | 1 |
| C6 | 0 | 1 | 1 | 1 | 1 | 1 | 1 |
| VC | 0 | 0 | 0 | 0 | 1 | 1 | 1 | where the seven columns correspond to different integer values of NCYL (1–7) and the rows identify different cylinders. Rows 1–6 identify the actual cylinders C1–C6 and the seventh row identifies a "virtual cylinder" (VC) to be more fully described hereinafter.

For a given row, column (cylinder, NCYL) coordinate of table I, a zero (0) designates that the corresponding cylinder is skipped and a one (1) indicates that the corresponding cylinder is to be fueled and fired. Thus, for row=C2, bution for both constant and changing values of NCYL. Furthermore, by selecting basis integer B to be greater than the number of available cylinders, a more finely divided range of skip-fueling becomes available. Nonetheless, in other embodiments, skip-fueling patterns may be determined and shifted in a different manner with or without control system 220. Moreover, alternative embodiments may not alternate or shift which cylinders are skipped, instead skipping the same cylinders as long as there is no change in the number to be skipped. In still other embodiments, skip-fueling may not be implemented at all.

Skip-fueling may be implemented to efficiently and effectively respond to changing load conditions without adjustment of a throttle. Instead, a wide-open setting is maintained. Indeed, in other alternative embodiments, skip-fueling may be utilized in place of throttle adjustments, facilitating implementation of a throttless engine operating system. Also, skip-fueling techniques of the present invention may be implemented, with or without retarded ignition timing techniques to the advantage of many internal combustion engine applications besides electric power generation, including marine vehicles, land vehicles, and various industrial internal combustion engine systems, to name a few. Skip-fueling may be applied to enhance efficiency not only for load transitions, such as load acceptance and load shed; but also during no load, partial load, and full load steady state operation.

Figure 8:
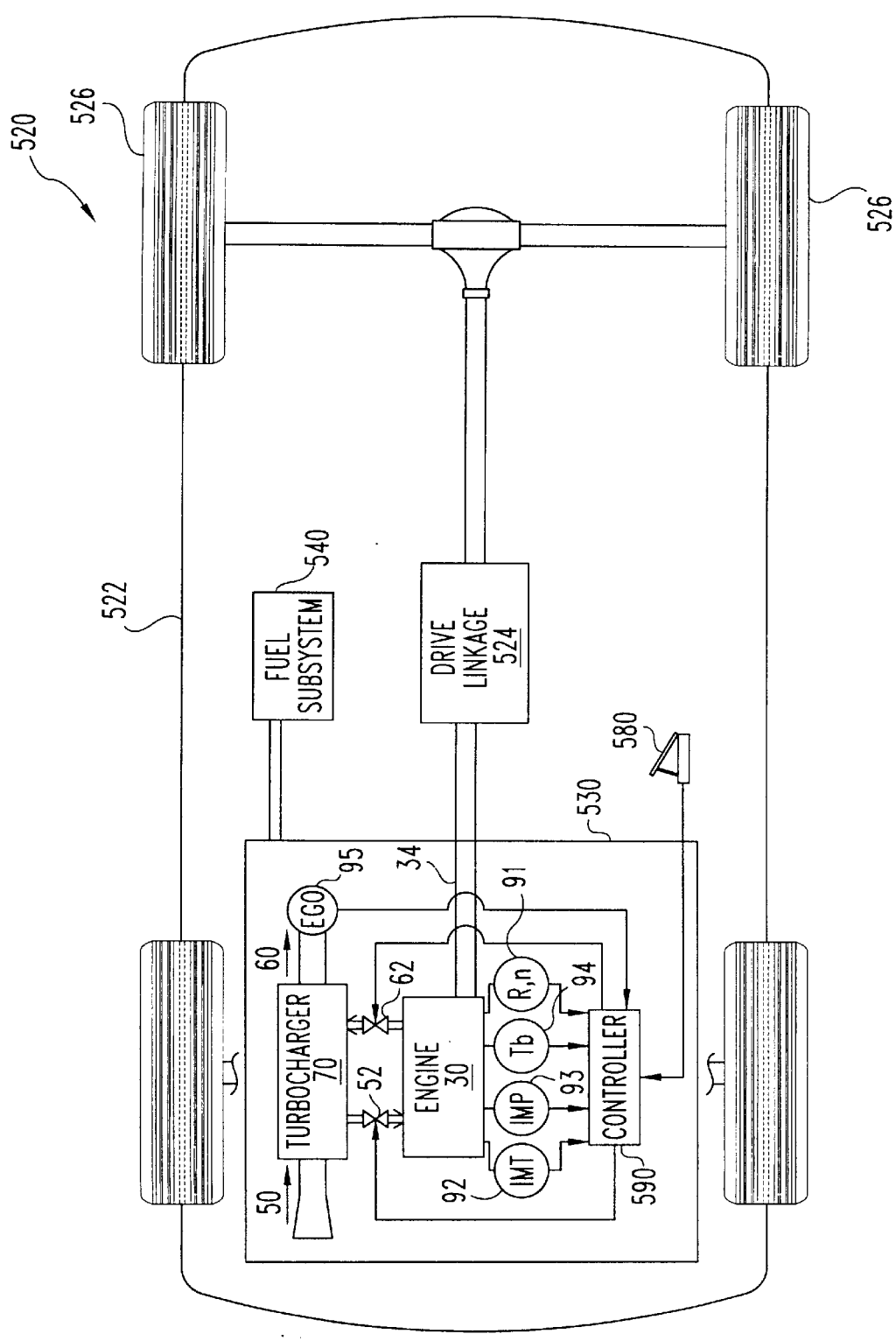
FIG. 8 is a schematic view of a vehicle system.

FIG. 8 depicts one such alternative embodiment of the present invention as vehicle system 520; where like reference numerals refer to like features previously described. Vehicle system 520 includes vehicle 522 with wheels 526 selectively driven by engine sybsystem 530 via drive linkage 524. Engine subsystem 530 includes engine 30 rotatably coupled to drive linkage 524 via crankshaft 34. Drive linkage 524 may include a transmission, driveshaft, and other components as would occur to those skilled in the art to provide an effective drive train for vehicle 522.

Engine 30 of subsystem 530 is configured as a prime mover for vehicle 522 and includes cylinders C1–C6, pistons P1–P6, and injectors I1–I6 as previously described in connection with system 20. Fueling subsystem 540 provides fuel to engine 30, and is preferably arranged to be carried with vehicle 522. It is preferred that engine 30 be operated with a gaseous fuel as discussed in connection with fueling subsystem 40 of FIG. 1, although engine 30 may additionally or alternatively be configured for operation with a different fuel type.

Engine subsystem 530 also includes an air intake path 50, exhaust pathway 60, and turbocharger 70 arranged in the manner previously described in connection with system 20. Throttle valve 52 may be adjusted to control the flow of air along pathway 50 to engine 30. Wastegate valve 62 is provided to control operation of turbocharger 70 by adjusting the flow of exhaust gases along pathway 60 in the manner described for system 20. Subsystem 530 also includes controller 590 operatively coupled to rotation sensor 91 to determine signals R, n; torque sensor 94 to determine signal Th; pressure sensor 93 to determine signal IMP; temperature sensor 92 to determine signal IMT; and oxygen sensor 95 to determine signal EGO as previously described. Controller 590 is also operatively coupled to valves 52, 62 to regulate operation thereof. An operator-adjustable throttle input device 580 is operatively coupled to controller 590. By way of nonlimiting example, input device 580 may be a vehicle accelerator in an operator compartment (not shown) of vehicle 522. Controller 590 is preferably configured to selectively adjust engine speed and/or vehicle speed in response to a change in an input signal from input device 580.

It is preferred that, like controller 90, controller 590 embody control system 220 in hardware and/or programming as appropriate. It is preferred that controller 590 be configured to utilize skip fueling and/or retarded ignition timing to improve operation of engine subsystem 530 in its role as a source of propulsion power for vehicle 522. In one embodiment, an operator selects a desired engine speed by adjusting input device 580. The corresponding adjustment signal from device 580 is received by controller 590 and is converted to a desired torque command TCMD with an electronic governor embodied in controller 590. Such a governor typically relates engine speed to torque in terms of a look-up table embedded in an electronic memory that may be selectively accessed by an engine controller, such as controller 590. Torque command TCMD may be utilized in conjunction with signals R, n, IMT, IMP, Th, and EGO by control system 220 to regulate operation of engine 30 as previously described in connection with FIGS. 3–5. Notably, control system 220 need not include indicator 96 in conjunction with boost threshold test operator 224 for system 520.

For system 520, skip-fueling and retarded timing of control system 220 are preferably utilized to improve responsiveness to heavy load demands on engine 30 in a manner comparable to routine 120. Moreover, for systems 20 and 520 alike, control system 220 may be utilized to regulate steady-state loading at all loading levels. For instance, control system 220 may be utilized to regulate a full, steady-state load by disabling skip-fueling and retarded ignition timing. For a light, steady-state load, more likely to be encountered during operation of system 520, it is envisioned that skip-fueling may be utilized to improve efficiency without retarding ignition timing. In fact, other embodiments may implement skip-fueling in accordance with control system 220 without implementation of a retarded ignition timing feature. Such embodiments, may or may not include a turbocharger.

Figure 6:
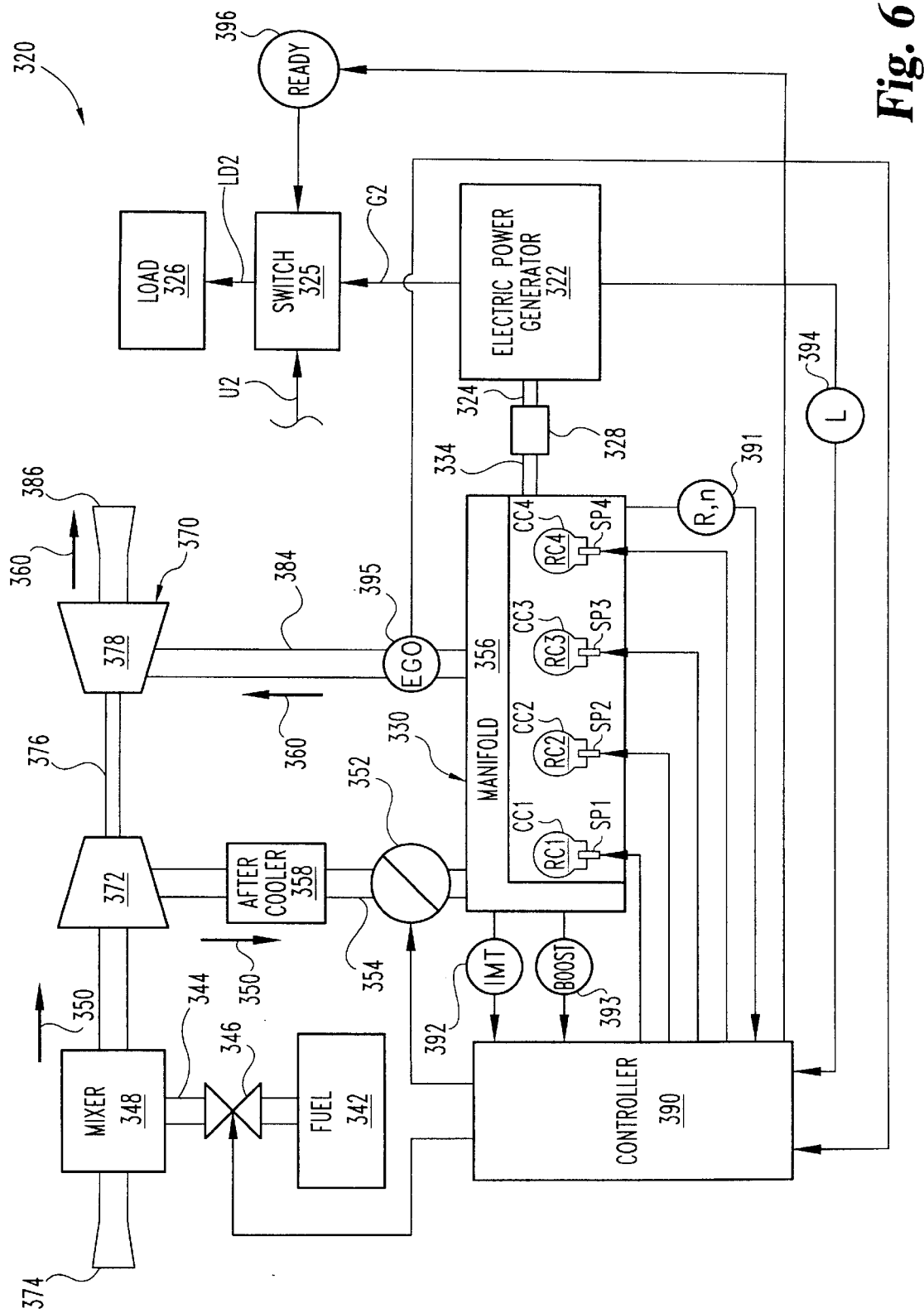
FIG. 6 is a schematic view of a second embodiment of an electric power generation system.

Still another embodiment of the present invention is presented in the schematic view of FIG. 6 as electric power generation system 320. System 320 includes electric power generator 322 driven by generator shaft 324. Electric power generator 322 has an electrical output bus G2 which is operatively connected to power switch 325. Power switch 325 also has an electric power utility bus U2 operatively coupled thereto and may be employed to route either bus G2 or bus U2 to bus LD2 to power load 326. In correspondence with switch 25 shown in FIG. 1, switch 325 is responsive to the READY signal to select bus G2 over bus U2.

Generator shaft 324 is coupled to crankshaft 334 of internal combustion engine 330 by coupling linkage 328. Like shaft coupling 28 shown in FIG. 1, linkage 328 may include a clutch, gearbox, or other arrangement as would occur to one skilled in the art. Alternatively, shafts 324 and 334 may be directly interconnected to turn together at the same rotational speed. Engine 330 further includes four reciprocating cylinders RC1–RC4 with combustion chambers CC1–CC4, respectively. Each of the four cylinders RC1–RC4 includes a corresponding spark plug (SP1–SP4) to ignite a fuel charge contained in a respective one of combustion chambers CC1–CC4 in accordance with a conventional four-stroke combustion process. In alternative embodiments, a two-stroke engine, a rotor-based multicycle engine, or such other engine type may be utilized as would occur to those skilled in the art.

Engine 330 is in fluid communication with intake pathway 350. Intake pathway 350 includes an electronically controllable throttle valve 352 positioned along intake conduit 354.

Also positioned along intake conduit 354 is aftercooler 358 which is configured to receive a mixture of fuel and air from mixer 348. Mixer 348 receives external air via intake 374 and gaseous fuel from gaseous fuel source 342 along conduit 344 at a flow rate established by electrically controlled valve 346; however, as in the case of system 20, alternative fuel types may be utilized as would occur to those skilled in the art.

The fuel charge from mixer 348 is drawn through conduit 354 by compressor 372 of turbocharger 370. Turbocharger 370 also includes turbine 378 which drives compressor 372 via rotatable coupling 376. Engine 330 also includes exhaust pathway 360. Turbine 378 is driven by an exhaust stream through exhaust conduit 384 of pathway 360. As in the case of turbine 78, the relative temperature and mass flow through conduit 384 are principle factors determining the rotational speed at which turbine 378 is driven and correspondingly the pressure provided by compressor 372. After engaging turbine 378, exhaust exits through outlet 386 of exhaust pathway 360.

System 320 also includes controller 390 which is operatively coupled to throttle valve 352 and valve 346 to supervise fuel charge intake. In addition, controller 390 includes outputs to control the timing of spark plugs SP1–SP4. Controller 390 also receives an intake manifold temperature signal represented by signal IMT from sensor 392 and an intake manifold pressure signal represented by signal BOOST via sensor 393. Furthermore, as in the case of system 20, controller 390 is operatively coupled to sensor 391 to detect a signal R indicative of rotation of engine 330. Rotational engine speed signal n is derived from signal R as described for system 20. Controller 390 is also coupled to load sensor 394 which provides a signal L corresponding to the electrical loading of generator 322. In addition, controller 390 is coupled to exhaust gas oxygen sensor 395 to determine the amount of residual oxygen in the exhaust gases flowing through exhaust pathway 360. Similarly, like controller 90, controller 390 provides an output signal READY to an indicator 396 that corresponds to the ability of engine 330 to accept a block load from generator 322.

However, unlike engine 30, engine 330 does not have fuel injection. Instead, engine 330 receives a fuel charge that is mixed upstream. The arrangement presented in system 320 is indicative of smaller power generation requirements where a larger and more complex fuel-injection system is not warranted. For system 320, skip-fueling is preferably not utilized by engine 330. Instead, system 320 severely retards ignition timing to achieve this result.

Figure 7:
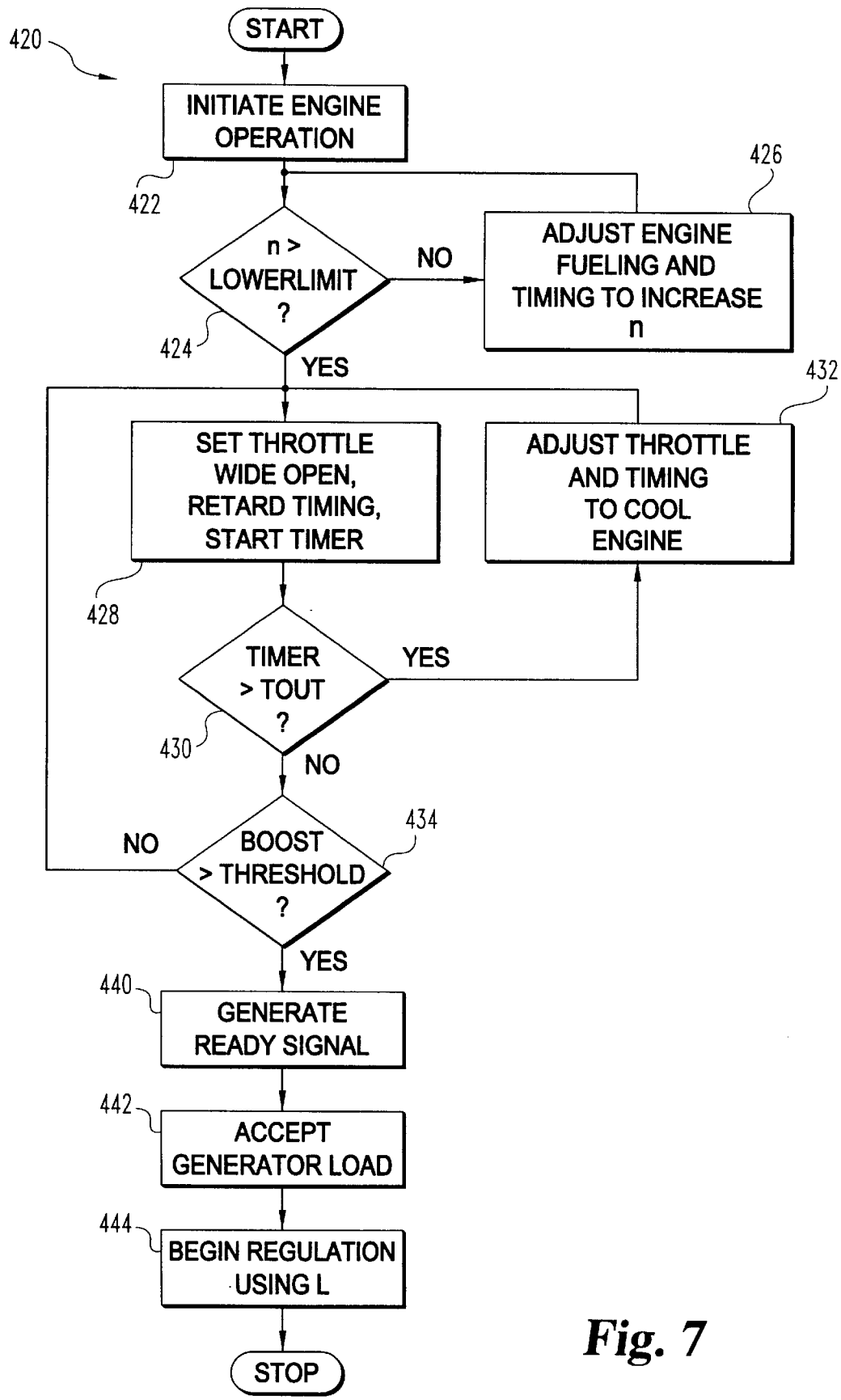
FIG. 7 is a flow chart illustrating a start-up routine for the system of FIG. 6.

Referring to the flow chart of FIG. 7, one embodiment of the operation of system 320 is illustrated as start-up routine 420. Routine 420 begins by initiating engine operation in stage 422. At this stage, generator 322 is in a stand-by mode. Upon initiating operation of engine 330, it is determined whether engine speed represented by signal n has exceeded threshold LOWERLIMIT as shown in conditional 424. If LOWERLIMIT has not yet been exceeded (n≦LOWERLIMIT), then control flows to stage 426 to adjust engine timing to increase n, and the routine loops back to conditional 424. Once n exceeds LOWERLIMIT (n>LOWERLIMIT), then control flows to stage 428. In stage 428, throttle valve 352 is set wide-open to permit maximum fuel charge flow through intake pathway 350. At the same time, ignition timing of engine 330 is retarded by controller 390 to correspondingly retard combustion in chambers CC1–CC4. This retarded ignition timing provides a higher temperature along exhaust pathway 360 that speeds-up turbine 378. Correspondingly, air flow through intake pathway 360 increases as compressor 373 is turned faster. Consequently, intake manifold pressure increases as indicated by signal BOOST, to facilitate acceptance of a load increase from generator 322.

Stage 428 also includes setting a timer to measure the duration that wide-open throttle and retarded timing conditions are active. As determined by conditional 430, if the time has exceeded a maximum limit TOUT (TIMER>TOUT), then throttle valve 352 and timing are adjusted to cool engine 330 in stage 432. Stage 432 is provided to prevent damage to engine 432 which may be caused by extreme temperatures resulting from the operations in stage 428. In contrast, the skip-fueling of system 20 is preferably arranged to prevent engine overheating by firing only a subset of cylinders when the timing is retarded.

After adjusting to cool engine 330 in stage 432, routine 420 loops back to stage 428 to once again resume wide-open throttle and retarded timing conditions, as well as restart the timer. Once again, conditional 430 is encountered to determine if TOUT has been exceeded. If not (TIMER≦TOUT), then control flows to conditional 434 to determine whether the boost pressure as represented by signal BOOST has exceeded a predetermined THRESHOLD. THRESHOLD is set to assure a pressure level needed to properly accept a block load from generator 322 corresponding to the electrical power needs of load 326. If this level has not been exceeded (BOOST≦THRESHOLD), then the routine loops back to stage 428 to maintain the wide-open throttle and retarded timing settings. A On the other hand, if BOOST does exceed THRESHOLD (BOOST>THRESHOLD), control flows to stage 440 to generate the READY signal and indicate readiness via indicator 396. Routine 420 control then flows to stage 442 to accept the generator load by connecting bus G2 to bus LD2 with switch 325; and thereby transition generator 322 from a stand-by mode to an on-line mode of operation. Once load 326 has been accepted, ignition timing is promptly advanced to stop retarded combustion, and engine 330 begins regulation using signal L from load sensor 394 in stage 444 to optimize performance of system 320. Start-up routine 420 is then concluded.

Controller 90, 390, 590 may be comprised of digital circuitry, analog circuitry, or both. Also, controller 90, 390, 590 may be programmable, a dedicated state machine, or a hybrid combination of programmable and dedicated hardware. Controller 90, 390, 590 can be an electronic circuit comprised of one or more components that are assembled as a common unit. Alternatively, for a multiple component embodiment, one or more of these components may be distributed throughout the relevant system. In one embodiment, controller 90, 390, 590 includes an integrated processing unit operatively coupled to one or more solid-state memory devices that contains programming to be executed by the processing unit in accordance with the principals of the present invention. The memory may be either volatile or nonvolatile and may additionally or alternatively be of the magnetic, optical, or such other variety as would occur to one skilled in the art. Besides the memory and processing unit, controller 90, 390, 590 can include any control clocks, interfaces, signal conditioners, filters, Analog-to-Digital (AID) converters, Digital-to-Analog (D/A) converters, communication ports, or other types of operators as would occur to those skilled in the art to implement the principles of the present invention. In a further form of the integrated circuit processing unit embodiment of controller 90, 390, 590, it may be provided with corresponding memory and any associated circuitry in a common, single Engine Control Unit (ECU) or Engine Control Module (ECM). Sensors of the present invention may provide a signal in either a digital or analog format compatible with associated equipment. Correspondingly, equipment coupled to each sensor is configured to condition and convert sensor signals to the appropriate format, as required.

It should be appreciated that systems of the present application better prepare an engine to accept a heavy load increase common to block loading by a generator. This increase may be relative to any, level of pre-existing load on the engine by the generator or other loading device. In one preferred embodiment for a electrical power generator application, the load increase is at least about 10 kilowatts. In a more preferred embodiment, the load increase is at least about 50 kilowatts.

In fact, many different embodiments of the present invention are envisioned, only a few examples of which are described as follows. In one example, retarded timing is used to adjust rotational engine speed while the engine is in a wide-open throttle (WOT) condition. Indeed, retarded timing control of engine speed may be used to provide various "throttleless" embodiments of the present invention. While systems 20, 320 are shown in a back-up generator arrangement for use in place of the nominal external utility service grid represented as bus U1, U2, respectively; other embodiments of the present invention are configured as stand-alone generator sets ("gensets") that are directly coupled to the electrical load without a switchable external power source connection. Alternatively or additionally, although systems 20, 320 monitor pressure via sensors 93, 293 directly, the determination of when to accept a load on an engine may be based on one or more other engine operating characteristics corresponding to boost pressure. By way of nonlimiting examples, such operating characteristics can include fueling rate, rotational speed of the engine as determined with sensors 91, 391, or measurement of a suitable time increment over which it is known that the boost pressure will reach a desired level through performance of skip-fueling and/or retarded combustion. In a further embodiment, start-up procedures other than routines 120, 420 may be utilized in keeping with the present invention as would occur to those skilled in the art. In still other embodiments, aspects of systems 20, 320, 520 are combined, duplicated, modified, or deleted as would occur to those skilled in the are.

As used herein, it should be appreciated that: variable, criterion, characteristic, quantity, amount, value, constant, flag, data, record, threshold, limit, input, output, matrix, command, and look-up table, each generally correspond to one or more signals within processing equipment of the present invention. It is contemplated that various functional blocks, operators, operations, stages, conditionals, procedures, thresholds, and processes described in connection with the present invention could be altered, rearranged, substituted, deleted, duplicated, combined, or added as would occur to those skilled in the art without departing from the spirit of the present invention.

All publications, patent, and patent applications cited in this specification are herein incorporated by reference as if each individual publication, patent, or patent application were specifically and individually indicated to be incorporated by reference and set forth in its entirety herein. Any theory of operation or finding described herein is merely intended to provide a better understanding of the present invention and should not be construed to limit the scope of the present invention as defined by the claims that follow to any stated theory or finding. While the invention has been illustrated and described in detail in the drawings and foregoing description, the same is to be considered as illustrative and not restrictive in character, it being understood that only the preferred embodiment has been shown and described and that all changes, modifications, and equivalents that come within the spirit of the invention as defined by the following claims are desired to be protected.

What is claimed is:

1. A method of generating electric power, comprising:

starting an internal combustion engine having a number of combustion chambers and a turbocharger, the engine being a prime mover for an electric power generator, the chambers each having a respective fueling period;

preparing the engine to accept a generator load by withholding fuel during the respective fueling period of a portion of the chambers to increase boost pressure provided with the turbocharger; and driving the generator with the engine, the engine accepting the generator load after increasing the boost pressure during said preparing.

2. The method of claim 1, wherein the generator generally presents a light load to the engine during said preparing and a heavy load to the engine during said driving, and the generator load corresponds to a difference between the heavy load and the light load.

3. The method of claim 1, wherein the engine and the generator are configured as a back-up electrical power generation system, the fuel is a gaseous fuel, the generator load is at least 10 kilowatts, said preparing includes generating a signal when the boost pressure reaches a predetermined threshold, and said driving includes fueling all the chambers during the respective fueling period.

4. The method of claim 1, further comprising:

providing an engine operating characteristic corresponding to the boost pressure, the engine operating characteristic being determined from at least one of a sensed boost pressure, a sensed engine speed, an engine fueling rate, or passage of a time increment; and initiating said driving in response to the engine operating characteristic reaching a predetermined threshold.

5. The method of claim 1, wherein said preparing includes retarding combustion in the chambers being fueled.

6. The method of claim 5, wherein the engine is of an SI or CI type and includes a number of pistons, the chambers each correspond to a respective one the pistons, and said retarding includes timing ignition of each of the chambers being fueled at least about 10 degrees ATDC relative to the respective one of the pistons.

7. The method of claim 1, wherein the portion is determined as a function of a predetermined integer differing from the number of chambers by at least one and further comprising changing which of the chambers belong to the portion in accordance with a predetermined skip-fueling pattern.

8. The method of claim 7, further comprising changing a quantity of the chambers belonging to the portion in accordance with a sensed level of the boost pressure.

9. The method of claim 8, further comprising:

establishing a desired engine torque;

sensing a measured engine torque;

sensing a rotational speed of the engine;

determining engine timing as a function of the rotational speed, the boost pressure, the measured engine torque, and the desired engine torque; and controlling fueling of the engine as a function of a rich fueling limit and a lean fueling limit, the rich fueling limit and the lean fueling limit being determined in accordance with the engine timing.

10. A method of generating electric power, comprising:

starting an internal combustion engine having a plurality of combustion chambers and a turbocharger, the engine being a prime mover for an electric power generator;

preparing the engine to accept a generator load by retarding combustion in one or more of the chambers to increase boost pressure with the turbocharger; and driving the generator with the engine, the engine accepting the load after increasing the boost pressure during said preparing.

11. The method of claim 10, further comprising lightly loading the engine with the generator during said preparing and heavily loading the engine with the generator during said driving.

12. The method of claim 10, wherein said preparing includes withholding fuel from a subset of the chambers during a respective fueling period.

13. The method of claim 10, wherein the fuel is gaseous, the generator load is at least 10 kilowatts, said preparing includes generating a signal when a boost pressure threshold is reached, and said driving includes fueling all the chambers without substantially retarding combustion thereof.

14. The method of claim 10, further comprising:
providing an engine operating characteristic corresponding to the boost pressure, the engine operating characteristic being determined from at least one of a sensed boost pressure, a sensed engine speed, an engine fueling rate, or passage of a time increment; and
initiating said driving in response to the engine operating characteristic reaching a predetermined threshold.

15. The method of claim 10, wherein the engine includes a number of pistons, the chambers each correspond to a respective one the pistons, and said preparing includes timing ignition within a range of about 10 to 20 degrees ATDC for each of the one or more chambers relative to the respective one of the pistons.

16. The method of claim 10, further comprising supplying a mixture of air and gaseous fuel through a conduit in fluid communication with an intake manifold of the engine, the engine including a controllable throttle valve to adjust flow of the mixture through the conduit, and
wherein said preparing includes changing position of the throttle valve to a substantially open condition.

17. The method of claim 10, wherein said preparing includes decreasing combustion retardation after a period of engine operation to cool the engine and increasing the combustion retardation after the engine cools.

18. The method of claim 10, wherein the engine is of an SI or CI type and includes a number of pistons, the chambers each correspond to a respective one the pistons, and said preparing includes timing ignition at least 10 degrees ATDC for each of the one or more chambers relative to the respective one of the pistons.

19. The method of claim 10, further comprising controlling rotational speed of the engine by changing ignition timing of the chambers.

20. The method of claim 19, wherein the engine has a wide-open throttle during performance of said controlling.

21. The method of claim 19, wherein the engine is throttleless.

22. An electric power generation system, comprising:
an electric power generator;
an internal combustion engine having a crankshaft rotatably coupled to said generator, said engine including:
a number of fuel injectors each operable to fuel a corresponding one of a number of combustion chambers of said engine during a respective fueling period;
a compressor to deliver pressurized air to said chambers; and
a turbine along an exhaust pathway to power said compressor when driven by exhaust from said chambers;
a controller operatively coupled to said injectors, said controller being operable to increase said pressure by withholding fuel during the respective fueling period of a subset of said chambers to prepare said engine to accept a generator load increase, said controller being further operable to cause said engine to accept said generator load increase after said pressure increases.

23. The system of claim 22, wherein said generator load increase is at least 10 kilowatts.

24. The system of claim 22, further comprising a plurality of igniters each corresponding to one of said chambers, said igniters each being responsive to said controller and said controller being operable to retard ignition of each of said chambers being fueled when preparing said engine for generator loading.

25. The system of claim 22, further comprising:
a first sensor to provide a first sensor signal corresponding to said pressure;
a second sensor to provide a second sensor signal corresponding to a rotational engine speed;
a third sensor to provide a third sensor signal corresponding to a measured torque produced by said engine; and
wherein said processor is responsive to said first sensor signal, said second sensor signal, and said third sensor signal to determine a rate of fuel flow to said engine as a function of said pressure, said engine speed, said measured torque, and a desired engine torque.

26. The system of claim 25, wherein said engine includes an intake manifold defining at least a portion of said intake pathway and said processor is responsive to said first sensor signal, said second sensor signal, and said third sensor signal to determine a desired engine ignition timing as a function of said pressure, said engine speed, and said measured torque.

27. The system of claim 26, wherein said processor further determines a rich fueling limit and a lean fueling limit as a function of said desired engine ignition timing.

28. The system of claim 27, wherein:
said subset is determined by said processor as a function of said rich fueling limit and said lean fueling limit; and
said processor adjusts a quantity of said chambers belonging to said subset to generally maintain fueling within a range from said lean fueling limit to said rich fueling limit.

29. The system of claim 22, wherein said subset of chambers corresponds to a predetermined skip-fueling pattern and said controller is configured to periodically shift said pattern relative to a predetermined order of all of said chambers to change which of said chambers belong to said subset, said pattern being determined in accordance with an integer that differs from said number of chamber by at least one.

30. The system of claim 29, wherein said engine is configured with a plurality of pistons each rotatably coupled to said crankshaft and corresponding to a respective one of said chambers.

31. An electric power generation system, comprising:
an electric power generator;
an internal combustion engine having a crankshaft rotatably coupled to said generator, said engine including:
a number of combustion igniters each corresponding to a different one of a number of combustion chambers of said engine;

a compressor coupled to an intake manifold to provide a gaseous fluid to said chambers at an intake pressure, a turbine along an exhaust pathway to power said compressor when driven by exhaust discharged from said chambers; and a controller operatively coupled to said igniters to regulate ignition timing of said engine, said controller being operable to prepare said engine to accept a generator load increase by retarding ignition in at least a portion of said chambers to increase said intake pressure, said controller being operable to cause said engine to accept said generator load increase after said pressure increases.

32. The system of claim 31, further comprising a mixer coupled by a conduit to said intake manifold, said mixer being coupled to a fuel source to receive fuel for mixing with air to form a combustible air/fuel charge, said gaseous fluid including said combustible air/fuel charge.

33. The system of claim 32, wherein said controller retards ignition timing of all of said chambers for a predetermined period of engine operation to prepare said engine to accept said generator load increase.

34. The system of claim 31, wherein said engine includes a plurality of pistons each rotatably coupled to said crankshaft and each corresponding to a respective one of said chambers.

35. The system of claim 29, wherein said portion of said chambers corresponds to a predetermined skip-fueling pattern and said controller is configured to periodically shift said pattern relative to a predetermined order of all of said chambers to change membership of said portion as a function of an integer that differs by at least one from said number of said chambers.

36. An electric power generation system, comprising:

an electric power generator;

a internal combustion engine having a crankshaft rotatably coupled to said generator, said engine including:

a plurality of pistons each rotatably coupled to said crankshaft and each corresponding to a respective one of a number of combustion chambers;

a compressor along an intake pathway to deliver pressurized air to said chambers;

a turbine along an exhaust pathway to power said compressor when driven by exhaust discharged from said cylinders; and a means for preparing said engine to accept a generator load by performing at least one of skip-fueling and retarded ignition timing to increase pressure provided by said compressor.

37. The system of claim 36, wherein said preparing means includes means for skip-fueling said engine and said skip-fueling means includes a number of patterns for allocating fuel among said chambers, said patterns each being established in accordance with an integer value that differs by at least one from said number of chambers.

38. The system of claim 37, wherein said preparing means includes a means for retarding ignition timing of said engine.

39. The system of claim 36, further comprising a throttle to control output of said engine and wherein said preparing means includes wide-open throttle operation of said engine.

40. A system, comprising:

an internal combustion engine including a number of cylinders each having a reciprocating piston, said cylinders each having at least one of a number of fuel injectors to selectively provide fuel;

a first sensor to provide a first signal corresponding to a performance characteristic of said engine;

a controller responsive to said first signal to provide skip-fueling of said engine, a quantity of skipped cylinders for a predetermined number of engine cycles being determined by said controller in accordance with said first signal, said controller defining a number of engine fueling patterns each corresponding to a different value of said quantity, said patterns each designating which of said cylinders are skipped and each being configured to rotate through a common number of positions relative to a reference cylinder, said common number differing from said number of cylinders by at least one, said controller selecting one of said patterns in accordance with said quantity and correspondingly generating at least one injection signal when said engine is being skip-fueled; and wherein said injectors respond to said at least one injection signal to fuel said cylinders in accordance with said one of said patterns.

41. The system of claim 40, wherein said common number is one more than the number of cylinders.

42. The system of claim 40, wherein said controller is responsive to a change in said first signal to adjust fueling of said engine from a first one of said patterns to a second one of said patterns.

43. The system of claim 40, wherein said controller is further configured to determine said at least one fuel injection signal in accordance with a rich fueling limit, a lean fueling limit, and said common number.

44. The system of claim 43, wherein said engine includes an intake manifold and a turbocharger and said first signal corresponds to boost pressure, and further comprising:

a second sensor to provide a second sensor signal corresponding to measured torque of said engine; and a third sensor to provide a third sensor signal corresponding to rotational engine speed;

wherein said controller is responsive to said first sensor signal, said second sensor signal and said third sensor signal to determine a desired engine ignition timing as a function of said boost pressure, said measured torque, and said engine speed.

45. The system of claim 40, further comprising a vehicle powered by said engine.

46. A system, comprising:

a four-cycle internal combustion engine including a number of cylinders each having a reciprocating piston, said cylinders each having at least one of a number of fuel injectors to selectively provide fuel;

a controller operatively coupled to said fuel injectors, said controller including a means for skip-fueling said cylinders, said means including a number of different fueling patterns each corresponding to a different number of said cylinders to be skipped, said patterns each being based on an integer that differs by one from said number of cylinders; and wherein said injectors are responsive to said means to selectively fuel said cylinders.

\* \* \* \* \*